United States Patent
Fox

(10) Patent No.: US 6,451,743 B1
(45) Date of Patent: Sep. 17, 2002

(54) STABLE LIQUID SUSPENSION COMPOSITIONS AND METHOD OF MAKING AND USE THEREOF

(75) Inventor: Kelly B. Fox, Bartlesville, OK (US)

(73) Assignee: Chevron Phillips Chemical Company LP, Houston, TX (US)

( * ) Notice: Subject to any disclaimer, the term of this patent is extended or adjusted under 35 U.S.C. 154(b) by 78 days.

(21) Appl. No.: 09/712,087

(22) Filed: Nov. 14, 2000

(51) Int. Cl.$^7$ .............................. C09K 7/00; C09K 7/06
(52) U.S. Cl. .................. 507/110; 507/111; 507/112; 507/113; 507/114; 507/115; 507/119; 507/123; 507/136; 507/139; 507/209; 507/211; 507/212; 507/213; 507/214; 507/215; 507/216; 507/217; 507/224; 507/229; 507/261; 507/266
(58) Field of Search ................................. 507/110, 111, 507/112, 113, 114, 115, 119, 123, 136, 139, 209, 211, 212, 213, 214, 215, 216, 217, 224, 229, 261, 266

(56) References Cited

U.S. PATENT DOCUMENTS

| | | | |
|---|---|---|---|
| 3,764,008 A | 10/1973 | Darley et al. | 210/73 |
| 3,971,440 A | 7/1976 | Hessert et al. | 166/270 |
| 4,312,675 A | 1/1982 | Pickens et al. | 106/171 |
| 4,425,241 A | 1/1984 | Swanson | 252/8.5 C |
| 4,427,556 A | 1/1984 | House et al. | 252/8.5 A |
| 4,514,310 A | 4/1985 | Heilweil | 252/8.55 R |
| 4,566,977 A * | 1/1986 | Hatfield | 507/110 |
| 4,579,942 A | 4/1986 | Brode et al. | 536/84 |
| 4,582,614 A | 4/1986 | House et al. | 252/8.5 A |
| 4,637,418 A * | 1/1987 | Karl | 507/139 |
| 4,743,383 A | 5/1988 | Stewart et al. | 252/8.51 |
| 5,362,713 A | 11/1994 | Westland et al. | 507/110 |
| 5,536,871 A | 7/1996 | Santhanam | 560/196 |
| H1611 H * | 11/1996 | Patel | 507/139 |
| 5,576,271 A | 11/1996 | Patel | 507/110 |
| 5,693,698 A | 12/1997 | Patel et al. | 524/386 |
| 5,925,182 A * | 7/1999 | Patel | 507/139 |
| 2002/0019318 A1 * | 2/2002 | Harris | 507/200 |

\* cited by examiner

*Primary Examiner*—Philip Tucker
(74) *Attorney, Agent, or Firm*—Charles W. Stewart

(57) ABSTRACT

A new stable liquid suspension containing non-soluble particles dispersed in a non-aqueous liquid medium having a concentration of a suspension aid and a method of making and use thereof.

34 Claims, No Drawings

STABLE LIQUID SUSPENSION COMPOSITIONS AND METHOD OF MAKING AND USE THEREOF

This invention relates to novel liquid suspension compositions, which can be used as additives in a water-based fluids, and methods of making and use of such liquid suspension compositions.

BACKGROUND OF THE INVENTION

Water-based fluids such as, for example, drilling fluids and mining fluids, are useful in a variety of industrial applications. It is well known to those skilled in the art of drilling wells to tap subterranean deposits of natural resources such as gas, geothermal steam or crude oil, especially when drilling by the rotary method or the percussion method wherein cuttings must be removed from the bore hole, that it is necessary to use a drilling fluid.

The use of water-based fluids in stimulation, workover and completion fluids in oil field operations is also well known. Workover fluids are those fluids used during remedial work in a drilled well. Completion fluids are those fluids used during drilling and during the steps of completion of the well.

Additives, chemicals, or other materials are often added to such water-based fluids for various reasons such as for controlling water loss, increasing viscosity, reducing corrosion, altering pH, and increasing density of the fluids. However, the addition of such materials to water-based fluids can be difficult unless proper precautions are taken to preclude agglomeration or plugging.

Liquid additives and processes therefor have been developed to overcome some of the problems. However, the hydrocarbons and other compounds used as the liquid medium of such stable liquid additive suspensions may not be environmentally friendly; because, they are often not biodegradable or because their use in drilling and well treatment fluids may result in noncompliance with EPA oil and grease effluent limitations.

It is, therefore, highly desirable to develop a liquid suspension composition which remains stable, useable as an additive in water or water-based fluids, and which is environmentally friendly for use in oil field applications.

SUMMARY OF THE INVENTION

It is thus an object of this invention to provide a stable liquid suspension composition which is environmentally friendly and useful in oil field applications.

Other aspects, objects, and the several advantages of the invention will become more apparent in light of the following disclosure.

According to a first embodiment of the invention, a stable liquid non-aqueous liquid suspension is provided. The non-aqueous suspension composition comprises non-soluble particles that are dispersed in a non-aqueous liquid medium. The non-aqueous medium has a concentration of a suspension aid. The non-aqueous liquid medium is selected from the group consisting of glycols, polyglycols, glycol ethers, glycol esters and glycol ether esters. The suspension aid is selected from the group consisting of hydroxypropyl cellulose, ethyl cellulose, polyvinyl pyrrolidone, polyacrylic acid, and copolymers of polyvinyl pyrrolidone and acrylic acid.

In a second embodiment of the invention, a non-aqueous suspension is prepared by mixing non-soluble particles, a suspension aid, and a liquid medium to thereby form the non-aqueous suspension. The liquid medium is selected from the group consisting of glycols, polyglycols, glycol ethers, glycol esters and glycol ether esters.

According to a third embodiment of the invention, a method is provided for treating oil or gas wells or any of the surrounding subterranean formations adjacent to such oil or gas wells. This method comprises the steps of admixing with a water-based fluid a composition comprising non-soluble particles dispersed in a non-aqueous liquid medium having a concentration of a suspension aid. The non-aqueous liquid medium is selected from the group consisting of glycols, polyglycols, glycol ethers, glycol esters and glycol ether esters. The suspension aid is selected from the group consisting of hydroxypropyl cellulose, ethyl cellulose, polyvinyl pyrrolidone, polyacrylic acid, and copolymers of polyvinyl pyrrolidone and acrylic acid. The thus-formed admixture is introduced into a wellbore.

DETAILED DESCRIPTION OF THE INVENTION

In accordance with the present invention, the novel non-aqueous suspension medium comprises, consisting essentially of, or consists of a non-aqueous liquid medium having dissolved therein a concentration of a suspension aid and having dispersed in such liquid medium non-soluble particles. The non-aqueous liquid suspension may also be described as comprising, consisting essentially of, or consisting of a liquid medium, non-soluble particles, and a stabilizing amount of a suspension aid sufficient to enhance the stability of the suspension of non-soluble particles in the liquid medium.

As referred to herein, the term "non-aqueous" means, unless otherwise indicated, a liquid that contains a minor amount of water, but, preferably, the liquid is one that is substantially free of water. The minor amount of water in the non-aqueous suspension medium is a concentration of water that is low enough to assure that the inventive non-aqueous suspension maintains the fluid properties of a stable suspension. A minor amount of water is generally less than about ten weight percent (10%) of the non-aqueous liquid medium. Thus, a minor amount of water will be in the range upwardly to about ten weight percent (10%). As noted, it is preferred for the non-aqueous liquid of the invention to be substantially free of water. Therefore, the non-aqueous liquid medium of the invention can have less than about one weight percent (1%) water, preferably, the amount of water is less than about 0.5 weight percent, and, most preferably, the amount of water is less than 1000 parts per million by weight (ppmw).

An important aspect of this invention is for the non-aqueous liquid medium to be an environmentally friendly compound. That is, a compound that is readily biodegradable when exposed to the environment and which passes the so-called oil and grease test by not being extractable from water by use of the extraction solvents as described in EPA Method 413.1 and EPA Method 1664.

Any suitable material that is in the liquid phase at ambient conditions, typically at temperatures between −30° C. to 50° C., preferably, between −20° C. to 40° C., and meets the above described criteria can be used as the non-aqueous liquid medium of the suspension composition of the invention so long as it forms a stable liquid suspension of the non-soluble particles when combined with the non-soluble particles and the suspension aid. The non-soluble particles and suspension aid are more fully defined elsewhere herein.

Among the non-aqueous liquid medium compounds are those chemical compounds selected from the group consisting of glycols, polyglycols, glycol ethers, glycol esters and glycol ether esters.

Each glycol or polyglycol compound suitable for use as the non-aqueous liquid medium of the invention should have a molecular weight greater than about 100; because, those compounds that have molecular weights below about 100 tend to undesirably solvate the suspended particles. However, due to the requirement that the non-aqueous liquid medium be in the liquid phase at ambient temperatures, its molecular weight should be less than about 4,000. Therefore, suitable glycols and polyglycols can have a molecular weight in the range of from about 100 to about 4,000, preferably from about 100 to about 3,000, and more preferably, from about 100 to 2,750.

The glycols that can be used as the non-aqueous medium have the following general formula:

$$H-O-R_1-O-H$$

where $R_1$, is an alkyl group having from 4 to 8 carbon atoms, preferably, from 3 to 4 carbon atoms. Examples of suitable glycols include butylene glycol, 1,5-pentanediol and hexylene glycol.

The polyglycols that can be used as the non-aqueous medium have the following formula:

$$H-[O-R_1]_nO-H$$

where $R_1$ is an alkyl group having from 1 to 6 carbon atoms, preferably, from 2 to 4 carbon atoms. Specific examples of polyglycols that can suitably be used include, but are not limited to, diethylene glycol, triethylene glycol, dipropylene glycol, tripropylene glycol, polyethylene glycol (having a molecular weight between 200 to 4,000), and polypropylene glycol (having a molecular weight between 200 to 4,000). The presently preferred polyglycols for use as the non-aqueous medium are diethylene glycol, triethylene glycol and polypropylene glycol. Polypropylene glycol is particularly preferred because of its commercial availability and effectiveness.

The glycol ethers that can be used as the non-aqueous medium have the following general formula:

$$R_2[O-R_1]_nO-R_2$$

where $R_1$ is an alkyl group having from 1 to 6 carbon atoms, preferably, from 2 to 4 carbon atoms, and where each $R_2$ can be the same or different and further where $R_2$ is either a hydrogen or an alkyl group having from 1 to 10 carbon atoms, preferably, from 1 to 4 carbon atoms. The value for $n$ is an integer in the range of from 1 to 10. Specific examples of glycol ethers which can suitably be used as the non-aqueous medium include, but are not limited to, 2-Butoxyethanol, 2-(2-Butoxyethoxy)ethanol, di(propylene glycol)methyl ether, diethylene glycol dimethyl ether, diethylene glycol ethyl ether, and diethylene glycol butyl ether. The presently preferred glycol ethers for use as the non-aqueous liquid medium of the novel suspension composition are diethylene glycol ethyl ether and diethylene glycol butyl ether. The most preferred glycol ether is diethylene glycol butyl ether.

The glycol esters that can be used as the non-aqueous medium have the following general formula:

$$R_1[R_2-O]_nR_3$$

where $R_1$ is a carboxyl group having from 1 to 6 carbon atoms, preferably, from 1 to 4 carbon atoms, and where $R_2$ is an alkyl group having from 1 to 6 carbon atoms, preferably, from 1 to 4 carbon atoms, and where $R_3$ is either a hydrogen or a carboxyl group having from 1 to 6 carbon atoms, preferably, from 1 to 4 carbon atoms. The value for $n$ is an integer in the range of from 1 to 10. Specific examples of glycol ester compounds that can suitably be used as the non-aqueous liquid medium include, but are not limited to, 1,2-Ethanediol monoacetate and ethylene glycol diacetate.

Examples of glycol ether ester compounds that can suitably be used as the non-aqueous medium include, but are not limited to, 2-ethoxy ethyl acetate, di(ethylene glycol)ethyl ether acetate, di(ethylene glycol)butyl ether acetate and di(propylene glycol)methyl ether acetate.

It is an important aspect of the present invention for the suspended particles of the non-aqueous suspension to be substantially non-soluble, or only partially soluble, in the non-aqueous liquid medium. But, they also must form a relatively stable suspension when mixed in such medium. Thus, the non-soluble particles are solid particulates that are substantially insoluble, or partially soluble, in the non-aqueous liquid medium.

When referring herein to the stability of a liquid suspension, it is understood that a stable liquid suspension is defined as a liquid suspension in which the non-soluble particles remain dispersed in the liquid phase and do not settle out and separate from the liquid phase after a substantial period time has passed. Generally, such time period exceeds 3 days (i.e. 72 hours), but preferably, the non-soluble particles should remain dispersed in the liquid phase, or non-aqueous liquid medium, for a period of time exceeding 5 days (i.e. 120 hours) and, most preferably, the particles should remain dispersed in the liquid phase, or non-aqueous liquid medium, for a period of time exceeding 10 days (i.e. 240 hours).

The non-soluble particles of the inventive composition should have such properties as to permit their suspension in the non-aqueous liquid medium while at the same time being non-soluble in such medium. It is preferred for the average diameter of the non-soluble polymer particles to be in the range from about 50 angstroms to about 2000 microns. The non-soluble polymer particles can be colloidal in size (e.g. from about 50 Å to about 2000 Å), but it is not necessary; provided, that, they are easily dispersed within the non-aqueous liquid medium to form a stable solution when combined with the other components of the suspension composition.

Examples of materials suitable for use as non-soluble particles of the invention composition include various known natural and synthetic polymeric organic viscosifiers that are commonly used in well treatment fluids; for example, such components include biopolymers, such as xanthan (xanthan gum), cellulose compounds including hydroxyethylcellulose (HEC); carboxylmethylcellulose (CMC); guar gum; starch; derivitized guar; polyacrylamide; and other water soluble synthetic polymers. Also, certain non-polymeric materials can be used as the non-soluble particles of the inventive composition, such as borax and salts of ethylene diamine tetra acetic acid. The preferred material for use as the non-soluble particle of the invention is guar gum.

Another important component of the non-aqueous suspension is the suspension aid used to provide additional viscosity to the liquid medium so as to assist in keeping the non-soluble particulate material dispersed in the liquid medium. It is essential that the properties of the suspension aid be such that it is soluble, or at least partially soluble, in the non-aqueous liquid medium of the inventive composition while at the same time enhancing the suspendability of the non-soluble particles within the liquid phase of the composition and, thus, the stability of the inventive composition. It has been found that small concentrations of the compounds of hydroxylpropylcellulose (HPC), ethyl cellulose, polyvinyl pyrrolidone, polyacrylic acid, or copolymers of polyvinyl pyrrolidone and acrylic acid assist in significantly enhancing the stability of the non-aqueous suspension. Thus, an essential feature of the inventive composition is for the non-aqueous liquid medium to contain a concentration of either hydroxypropyl cellulose, or ethyl cellulose, or polyvinyl pyrrolidone, or polyacrylic acid, or a copolymer of polyvinyl pyrrolidone and acrylic acid in such an amount that it is sufficient to enhance the stability of the suspension of the non-soluble particles in the non-aqueous liquid medium of the inventive composition. The preferred suspension aid is hydroxypropyl cellulose.

Based on the total weight of the non-aqueous liquid suspension composition of the present invention, the suspended non-soluble particles in the total suspension composition solution can be present in any weight percent provided the suspension is stable. Generally, however, the weight percent of suspended particles in the total suspension composition can be in the range from about 10 weight percent to about 70 weight percent, preferably, from about 20 weight percent to about 60 weight percent and, most preferably, from 30 weight percent to 50 weight percent.

As for the concentration of the suspension aid in the non-aqueous suspension composition, it must be present in the non-aqueous liquid medium in an amount and at a concentration sufficient to provide the necessary function of enhancing the stability of the suspended particles in the liquid phase of the suspension composition. It has been found that a concentration as a percentage of the total weight of the non-aqueous suspension composition of at least 0.1 weight percent is required to provide the necessary suspension aid function. The upper limit for concentration of the suspension aid is dictated by the maximum thickness of the non-aqueous suspension composition that may practically be handled. It has been found that the maximum concentration of the suspension aid in the non-aqueous suspension composition should not exceed about 0.9 percent of the total weight of such composition. Thus, the concentration range for the suspension aid in the non-aqueous suspension composition can be in the range of from about 0.1 weight percent to about 0.9 weight percent. Preferably, the concentration range for the suspension aid should range from about 0.125 weight percent to about 0.7 weight percent and, most preferably, the concentration of the suspension aid should range from 0.15 weight percent to 0.35 weight percent.

The non-aqueous liquid medium component of the non-aqueous suspension composition will generally make up the remaining portion of the non-aqueous suspension composition with a typical range of from about 30 weight percent to about 90 weight percent of the liquid suspension, preferably from about 40 weight percent to about 80 weight percent, and, most preferably, from 50 to 70 weight percent of the total weight of the non-aqueous suspension composition.

The following Table 1 summarizes the ranges of the components of the inventive non-aqueous suspension composition of the invention.

TABLE I

Typical Ranges For the Components of the Stable Liquid Suspension

| Component | Broad Range | Range | Most Preferred Range |
| --- | --- | --- | --- |
| Non-Soluble Particles | 10–70% | 20–60% | 30–50% |
| Suspension Aid | 0.1–0.9% | 0.125–0.7% | 0.15–0.35% |
| Non-Aqueous Liquid Medium | 30–90% | 40–80% | 50–70% |

The inventive non-aqueous liquid suspension can be prepared by any suitable method known in the art. The components of the inventive composition may be mixed together in any order or altogether at the same time; however, it is preferred for the suspension aid to be first dissolved or mixed with the non-aqueous liquid medium prior to the addition of the non-soluble particles to the thus-formed liquid mixture.

Conditions for mixing or dissolving the suspension aid in the non-aqueous liquid medium are not a critical aspect of the invention and anyone skilled in the art may use conventional techniques for forming the solution. Generally, the temperature range for mixing the suspension aid in the non-aqueous liquid medium shall be in the range of from about 5° C. to about 150° C., but the preferred temperature range is from about 10° C. to about 100° C. and a most preferred temperature range is from about 20° C. to about 60° C.

Any standard mixing device that provides reasonably high sheer to assist in forming the solution of non-aqueous liquid medium and suspension aid can be used. The mixing time is that which is necessary to provide the desirable solution such that the suspension aid is dissolved in the non-aqueous liquid medium. Such mixing time is generally in the range of from about 0.01 hours to about 200 hours.

Once the solution of non-aqueous liquid medium and suspension aid is formed, the non-soluble particles are admixed to the thus-formed solution in such an amount as to provide the desirable concentration of non-soluble particles within the final non-aqueous liquid suspension composition.

The novel, non-aqueous liquid suspension described hereinabove is particularly suitable for use as an additive to water-based oil and gas oil well treatment fluids. Such well treatment fluids include, for example, stimulation fluids, fracture fluids, drilling fluids, completion fluids, and workover fluids. Typically, an oil or gas well will penetrate the surface of the earth and pass through various subterranean formations that contain deposits of natural resources such as oil and gas. Additives to the water-based fluid used either to drill or to treat wellbores or surrounding subterranean formations are used to reduce the amount of well treatment fluid that is lost to the surrounding formations or to enhance the carrying capacity or viscosity of such well treatment fluids. Thus, because of the particular properties of the inventive non-aqueous suspension described herein, it can suitably be used as an additive to oil and gas well treatment fluids by admixing with a water-based fluid in such manner as to form an admixture.

This admixture can be introduced into a wellbore thereby contacting it with the well face of the wellbore or with the subterranean formations surrounding the wellbore. Typically, the amount of non-aqueous suspension composition added to the water-based fluid shall be such as to give a weight ratio of water to additive in the range of from about 4000:1 to about 10:1. More typically, however, the ratio of water to additive in the resulting admixture of water-based fluid and additive shall range from about 3500:1 to about 30:1. Preferably, however, such ratio of water to additive shall range from 500:1 to 40:1. The most preferred ratio of water to additive is from 300:1 to 40:1.

The product of this invention is primarily tested by observation of the liquid suspension for stability over a wide temperature range. Stability can be measured by means of a ruler or other such graduated device whereby there is determined the thickness from the interface of the clear liquid portion of the portion of the liquid that separates from the portion of the liquid containing suspended solids.

The following specific examples are intended to illustrate the advantages of the present invention and are not intended to unduly limit the scope of the invention.

EXAMPLE 1

This Example shows the stability of the novel non-soluble polymer suspension having the components of guar gum suspended in the combined diethylene glycol butyl ether and hydroxypropyl cellulose.

700 grams of 0.4% hydroxylpropylcellulose (Klucel H from Hercules, Inc.) solution was first prepared. The 2.8 grams of hydroxypropyl cellulose was added to 697.2 grams of the di(ethylene glycol)butyl ether ("DBE") (Aldrich), heated to 175 degrees F. and stirred for four hours using a paddle type mixer. Once the hydroxypropyl cellulose was fully dissolved, portions of this solution were separated and diluted with di(ethylene glycol) butyl ether to yield the various other desired hydroxypropyl cellulose concentrations (Table 1). To each of these base fluids was added sufficient guar gum (Progum from PolyPro Inc., Dalton, Ga.) to produce a 40% w/w suspension of particles (Table 1). The viscosity of each suspension was determined using a Brookfield DV2 viscometer with a #3 LV disk spindle. The suspensions were finally placed into glass jars and observed for stability. Settling was evidenced by the separation of clear fluid to the surface of the suspension. The settling time, or the time required for the onset of fluid separation was recorded and is a measure of the suspension stability.

polymer solution. After seven days, although the solution was very viscous, there were still numerous undissolved particles. Sufficient di(ethylene glycol)butyl ether was added to dilute the polymer to a concentration of 0.5% and the solution was heated to 180 degrees F. and stirred for one hour. After cooling, a xanthan biopolymer (Flowzan® from Drilling Specialties Company) was added to produce a 40% w/w suspension of particles. In this example, 6% water was also added in order to reduce the density of the suspended particles.

The viscosity of this suspension was measured using a Brookfield DV2 viscometer with a #3 LV disk spindle. At 3 rpm, the viscosity of this suspension was 14,840 centipoise the suspension was placed into a glass jar and observed for indications of settling, as would be evidenced by a separation of clear fluid to the surface. During a period of 82 days, no settling was observed, indicating exceptional stability in the suspension.

The results shown in the above examples clearly demonstrate that the present invention is well adapted to carry out the objects and obtain the end and advantages mentioned as well as those inherent therein. While modifications may be made by those skilled in the art such modifications are encompassed within the spirit of the present invention is defined by the specification and claims.

That which is claimed is:

1. A non-aqueous suspension comprising:
   non-soluble particles dispersed in a non-aqueous liquid medium having a concentration of a suspension aid wherein said non-aqueous liquid medium is selected from the group consisting of glycols, polyglycols, glycol ethers, glycol esters, and glycol ether esters and wherein said suspension aid is selected from the group consisting of hydroxypropyl cellulose, ethyl cellulose, polyvinyl pyrrolidone, polyacrylic acid and copolymers of polyvinyl pyrrolidone and acrylic acid.

2. A non-aqueous suspension as recited in claim I wherein said non-aqueous liquid medium is selected from the group consisting of diethylene glycol, triethylene glycol, polypropylene glycol, diethylene glycol ethyl ether, and diethylene glycol butyl ether.

TABLE 2

| | Weight of Each Component (g) | | | Concentrations (%) | | | Suspension Viscosity | Settling |
|---|---|---|---|---|---|---|---|---|
| | Klucel H | DBE | Guar | Klucel H | Dioxitol | Guar | (centipoise) 3 rpm | Time (Hrs) |
| Composition A | 0 | 200 | 133.3 | 0 | 60 | 40 | 560 | 0.1 |
| Composition B | 0.40 | 199.6 | 133.3 | 0.12 | 59.88 | 40 | 2440 | 1 |
| Composition C | 0.60 | 199.4 | 133.3 | 0.18 | 59.82 | 40 | 8600 | 16 |
| Composition D | 0.72 | 179.3 | 120.0 | 0.24 | 59.76 | 40 | 21800 | >360 |

With no hydroxypropyl cellulose as a suspending agent, the guar gum particles began settling out of suspension almost immediately. With the addition of the suspending agent, the settling time was delayed. At a concentration of only 0.24%, the hydroxypropyl cellulose prevented particle settling for more than 360 hours.

EXAMPLE 2

This example demonstrates the long term stability of particle suspensions made with the hydroxypropyl cellulose in a di(ethylene glycol)butyl ether.

In this test, 2.25 grams of hydroxypropyl cellulose (Klucel H from Hercules Inc.) was blended into 222.60 grams of di(ethylene glycol)butyl ether to produce a 1%

3. A non-aqueous suspension as recited in claim 2 wherein said concentration of said suspension aid is in the range of from about 0.1 to about 0.9 weight percent of the total weight of the non-aqueous suspension, and wherein the amount of said non-aqueous liquid medium in the non-aqueous suspension is in the range of from about 30 weight percent to 90 weight percent of the total weight of the non-aqueous suspension.

4. A non-aqueous suspension as recited in claim 1 wherein said non-aqueous liquid medium is a polyglycol.

5. A non-aqueous suspension as recited in claim 4 wherein said concentration of said suspension aid is in the range of from about 0.1 to about 0.9 weight percent of the total weight of the non-aqueous suspension, and wherein the amount of said non-aqueous liquid medium is the non-aqueous suspension is in the range of from about 30 weight percent to 90 weight percent of the total weight of the non-aqueous suspension.

6. A non-aqueous suspension as recited in claim 1 wherein said non-soluble particles are polymeric viscosifiers selected from the group consisting of xanthan, hydroxyethyl cellulose, carboxyl methyl cellulose, guar gum, starch, derivitized guar and polyacrylamide.

7. A non-aqueous suspension as recited in claim 6 wherein said concentration of said suspension aid is in the range of from about 0.1 to about 0.9 weight percent of the total weight of the non-aqueous suspension, and wherein the amount of said non-aqueous liquid medium is the non-aqueous suspension is in the range of from about 30 weight percent to 90 weight percent of the total weight of the non-aqueous suspension.

8. A method of preparing a non-aqueous suspension, comprising the steps of:

mixing non-soluble particles, a suspension aid, and an liquid medium;

wherein said liquid medium is selected from the group consisting of glycols, polyglycols, glycol ethers, glycol esters and glycol ether esters to thereby form said non-aqueous suspension; and wherein said suspension aid is selected from the group consisting of hydroxypropyl cellulose, ethyl cellulose, polyvinyl pyrrolidone, polyacrylic acid and copolymers of polyvinyl pyrrolidone and acrylic acid; and wherein said non-soluble particles are polymeric viscosifiers selected from the group consisting of xanthan, hydroxyethyl cellulose, carboxyl methyl cellulose, guar gum, starch, derivitized guar and polyacrylamide.

9. A method as recited in claim 8 wherein said suspension aid is present in said non-aqueous suspension at a concentration in the range of from about 0.1 to about 0.5 weight percent of the total weight of said non-aqueous suspension, and wherein said non-aqueous liquid medium is present in said non-aqueous suspension at a concentration in the range of from about 30 weight percent to 90 weight percent of the total weight of the non-aqueous suspension.

10. A method as recited in claim 8 wherein said non-aqueous liquid medium is selected from the group consisting of diethylene glycol, triethylene glycol, polypropylene glycol, diethylene glycol ethyl ether, and diethylene glycol butyl ether.

11. A method as recited in claim 10 wherein said suspension aid is present in said non-aqueous suspension at a concentration in the range of from about 0.1 to about 0.9 weight percent of the total weight of said non-aqueous suspension, and wherein said non-aqueous liquid medium is present in said non-aqueous suspension at a concentration in the range of from about 30 weight percent to 90 weight percent of the total weight of the non-aqueous suspension.

12. A method of preparing a non-aqueous liquid suspension, said method comprises the steps of:

mixing non-soluble particles with a liquid medium and adding thereto a stabilizing amount of suspension aid sufficient to enhance the suspension of said non-soluble particles in said liquid medium; and wherein said suspension aid is selected from the group consisting of hydroxypropyl cellulose, ethyl cellulose, polyvinyl pyrrolidone, polyacrylic acid and copolymers of polyvinyl pyrrolidone and acrylic acid; and wherein said non-aqueous liquid medium is a polyglycol.

13. A method as recited in claim 12 wherein said suspension aid is present in said non-aqueous suspension at a concentration in the range of from about 0.1 to about 0.9 weight percent of the total weight of said non-aqueous suspension, and wherein said non-aqueous liquid medium is present in said non-aqueous suspension at a concentration in the range of from about 30 weight percent to 90 weight percent of the total weight of the non-aqueous suspension.

14. A method as recited in claim 12 wherein said non-soluble particles are polymeric viscosifiers selected from the group consisting of xanthan, hydroxyethyl cellulose, carboxyl methyl cellulose, guar gum, starch, derivitized guar and polyacrylamide.

15. A method as recited in claim 14 wherein said suspension aid is present in said non-aqueous suspension at a concentration in the range of from about 0.1 to about 0.9 weight percent of the total weight of said non-aqueous suspension, and wherein said non-aqueous liquid medium is present in said non-aqueous suspension at a concentration in the range of from about 30 weight percent to 90 weight percent of the total weight of the non-aqueous suspension.

16. A method as recited in claim 12 wherein said non-aqueous liquid medium is selected from the group consisting of diethylene glycol, triethylene glycol, polypropylene glycol, diethylene glycol ethyl ether and diethylene glycol butyl ether.

17. A method as recited in claim 16 wherein said suspension aid is present in said non-aqueous suspension at a concentration in the range of from about 0.1 to about 0.9 weight percent of the total weight of said non-aqueous suspension, and wherein said non-aqueous liquid medium is present in said non-aqueous suspension at a concentration in the range of from about 30 weight percent to 90 weight percent of the total weight of the non-aqueous suspension.

18. A method of treating an oil or gas well or any surrounding subterranean formations adjacent thereto, said method comprises the steps of:

admixing the composition of claim 1 with a water based fluid; and introducing the thus-formed admixture into a well bore.

19. A method of treating an oil or gas well or any surrounding subterranean formations adjacent thereto, said method comprises the steps of:

admixing the composition of claim 2 with a water based fluid; and introducing the thus-formed admixture into a well bore.

20. A method of treating an oil or gas well or any surrounding subterranean formations adjacent thereto, said method comprises the steps of:

admixing the composition of claim 3 with a water based fluid; and introducing the thus-formed admixture into a well bore.

21. A method of treating an oil or gas well or any surrounding subterranean formations adjacent thereto, said method comprises the steps of:

admixing the composition of claim 4 with a water based fluid; and introducing the thus-formed admixture into a well bore.

22. A method of treating an oil or gas well or any surrounding subterranean formations adjacent thereto, said method comprises the steps of:

admixing the composition of claim 5 with a water based fluid; and introducing the thus-formed admixture into a well bore.

23. A method of treating an oil or gas well or any surrounding subterranean formations adjacent thereto, said method comprises the steps of:

admixing the composition of claim 6 with a water based fluid; and introducing the thus-formed admixture into a well bore.

24. A method of treating an oil or gas well or any surrounding subterranean formations adjacent thereto, said method comprises the steps of:

admixing the composition of claim 7 with a water based fluid; and introducing the thus-formed admixture into a well bore.

25. A composition prepared by the method of claim 8.

26. A composition prepared by the method of claim 9.
27. A composition prepared by the method of claim 10.
28. A composition prepared by the method of claim 11.
29. A composition prepared by the method of claim 12.
30. A composition prepared by the method of claim 13.
31. A composition prepared by the method of claim 14.
32. A composition prepared by the method of claim 15.
33. A composition prepared by the method of claim 16.
34. A composition prepared by the method of claim 17.

* * * * *